United States Patent [19]
Folsom et al.

[11] Patent Number: 6,109,033
[45] Date of Patent: Aug. 29, 2000

[54] COMPACT COAXIAL PISTON TRANSMISSION

[75] Inventors: Lawrence R. Folsom; Clive Tucker, both of Pittsfield, Mass.

[73] Assignee: Folsom Technologies, Inc., Pittsfield, Mass.

[21] Appl. No.: 09/151,408

[22] Filed: Sep. 10, 1998

Related U.S. Application Data

[60] Provisional application No. 60/058,488, Sep. 10, 1997.

[51] Int. Cl.$^7$ ...................................................... F16D 39/00
[52] U.S. Cl. .............................................. 60/488; 60/487
[58] Field of Search ............................. 60/487, 488, 489, 60/490, 491, 492; 91/499, 505

[56] References Cited

U.S. PATENT DOCUMENTS

| | | |
|---|---|---|
| 1,840,865 | 1/1932 | Rayburn et al. . |
| 2,237,430 | 4/1941 | Higgins . |
| 2,543,584 | 2/1951 | Meinecke . |
| 2,678,536 | 5/1954 | Morgan . |
| 3,161,023 | 12/1964 | Margolin et al. . |
| 3,364,680 | 1/1968 | Osojnak . |
| 3,464,206 | 9/1969 | Badalini . |
| 4,373,408 | 2/1983 | Mills . |
| 4,845,961 | 7/1989 | Okuda et al. ............................. 60/489 |
| 4,901,529 | 2/1990 | Iino et al. . |
| 4,941,371 | 7/1990 | Koyama et al. . |
| 4,951,469 | 8/1990 | Hayashi et al. . |
| 4,967,556 | 11/1990 | Inoue . |

*Primary Examiner*—Edward K. Look
*Assistant Examiner*—Thomas E. Lazo
*Attorney, Agent, or Firm*—J. Michael Neary

[57] ABSTRACT

A hydrostatic axial piston transmission having a continuously variable transmission ratio includes an axial piston pump driven by an input shaft, the pump having an annular pump cylinder block with a ring of cylinders in which pump pistons reciprocate to pressurize and displace fluid from the pump cylinders. The pump is also coupled to an output shaft for conveying reaction torque from the input shaft directly to the output shaft as a first output torque component. An axial piston hydraulic motor has an annular motor cylinder block with a ring of motor cylinders in which motor pistons reciprocate in a power stroke to apply output torque to the output shaft, and a displacement stroke in which spent fluid is displaced from the motor cylinders for return to the pump cylinders. The pump cylinder block is concentrically disposed within the annulus of the motor cylinder block, and the input shaft and the output shaft lie on a longitudinal axis through the annulus. The pump cylinder block lies against a flat surface which is tilted at an angle with respect to the longitudinal axis of the machine, so that rotation of the pump cylinder block relative to the flat surface causes the pump pistons to reciprocate and displace fluid under pressure through commutating passages to the motor. Rotation of the input shaft drives the pump to displace pressurized fluid through pressure passages while also transmitting reaction torque to the output shaft. The fluid pressurized by the pump energizes the motor to produce a second component of output torque in the output shaft.

5 Claims, 17 Drawing Sheets

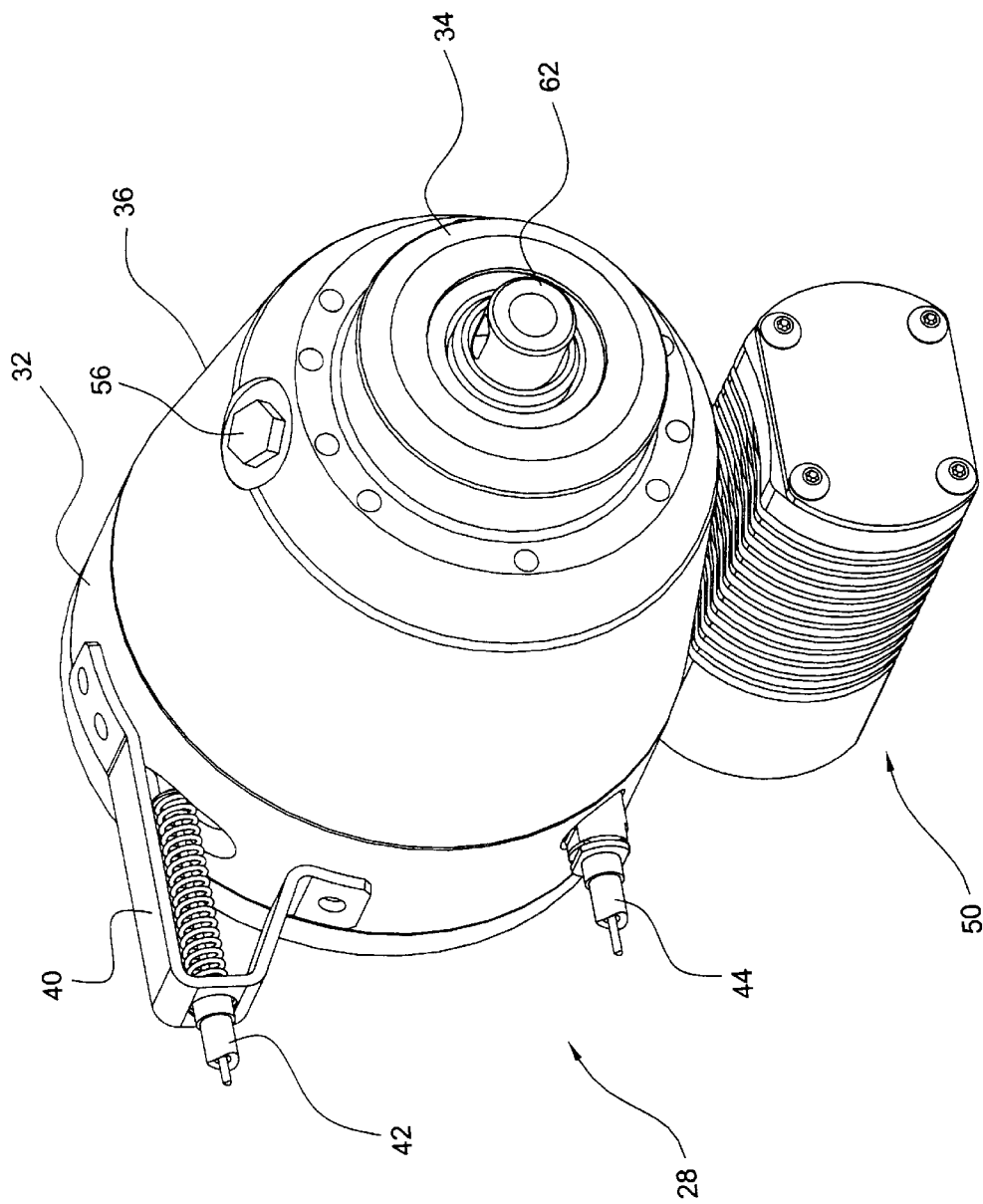

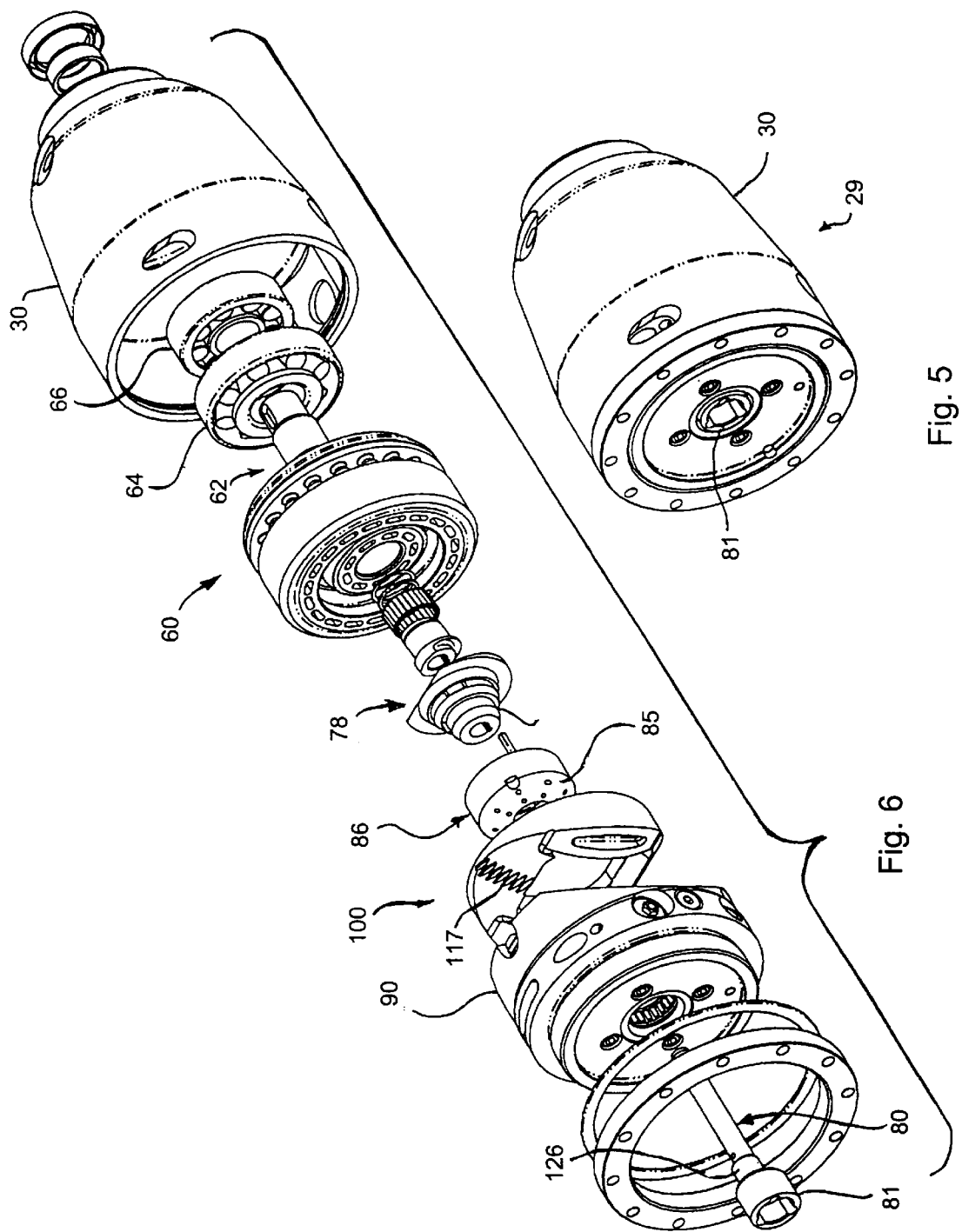

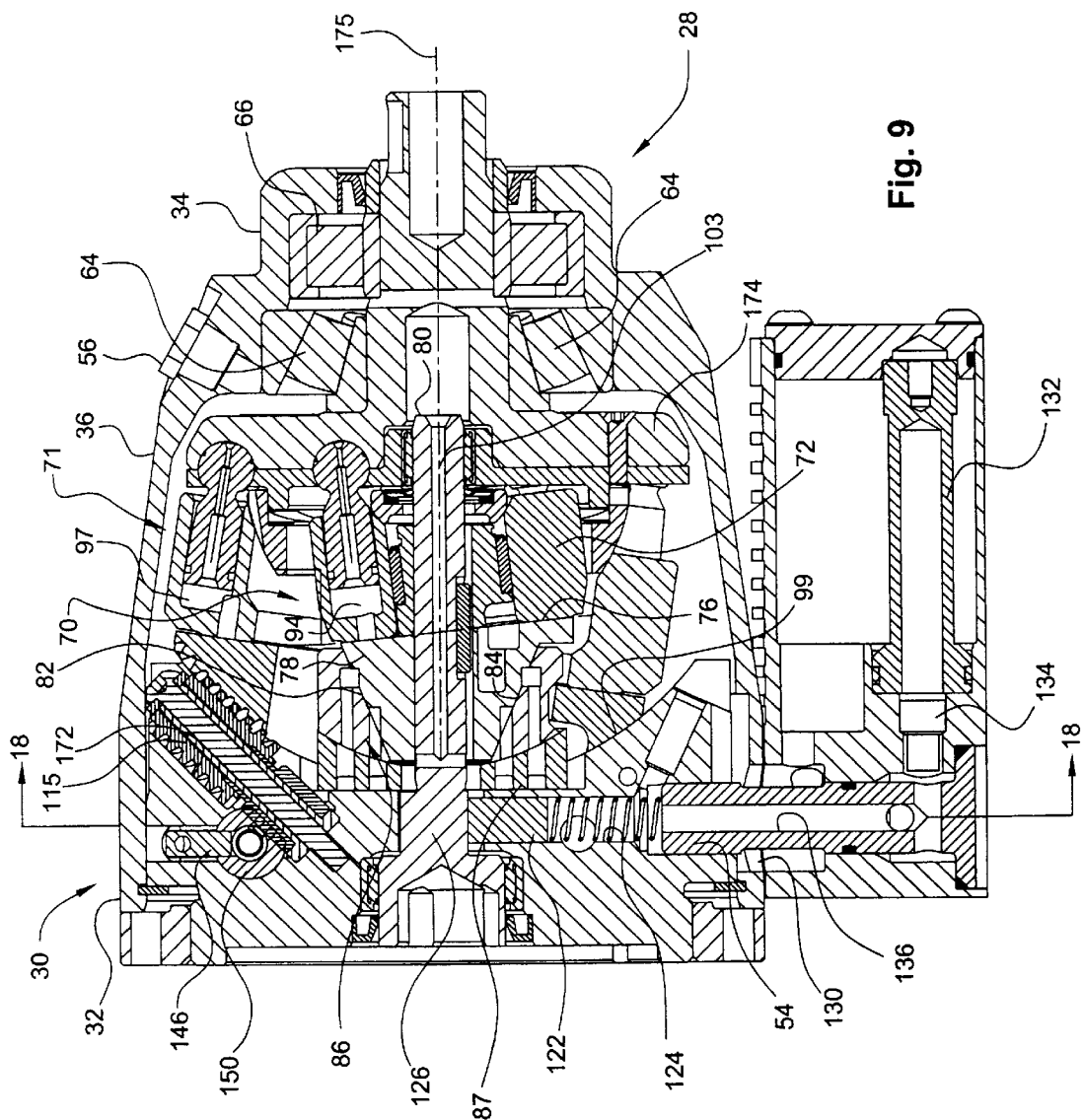

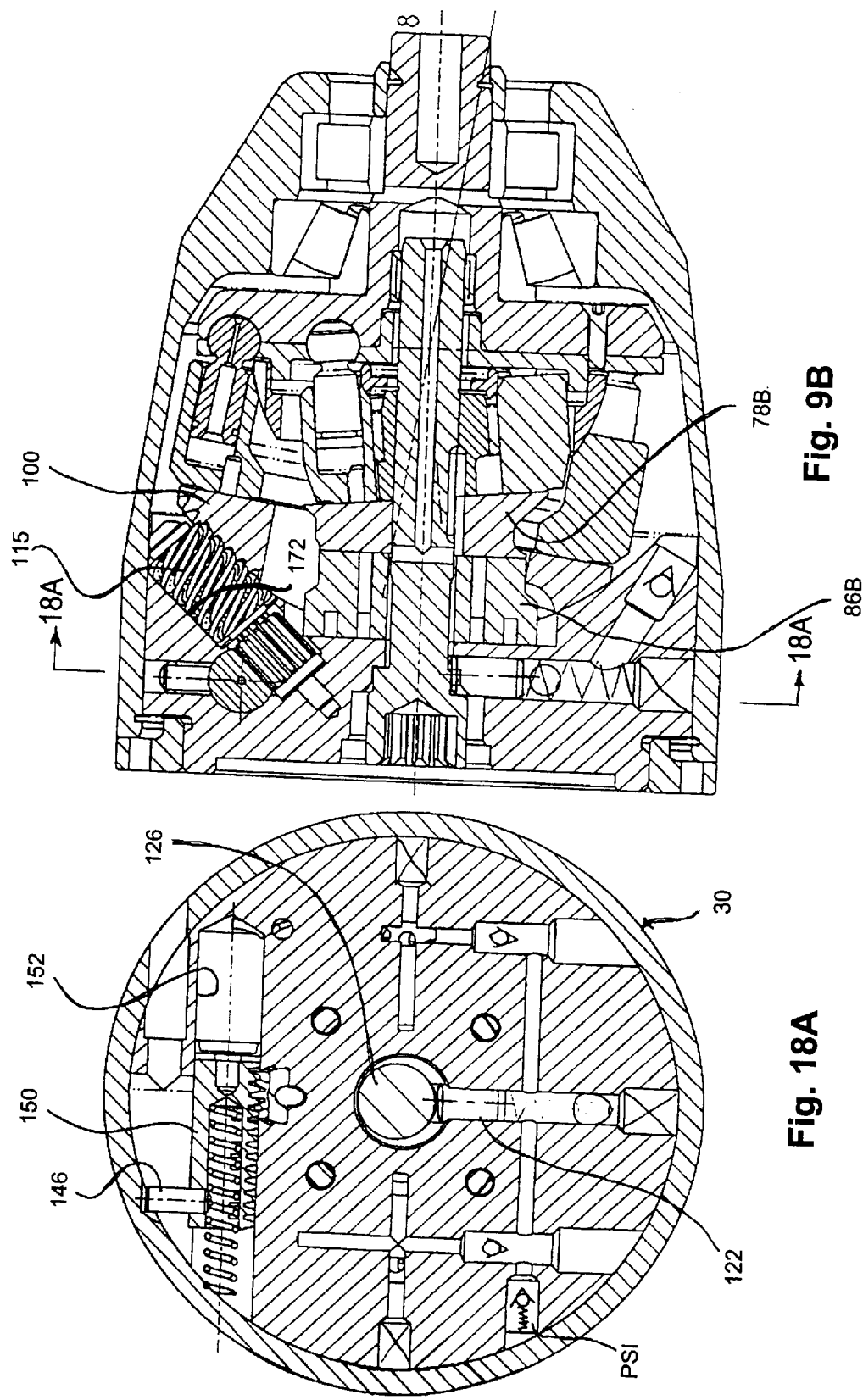

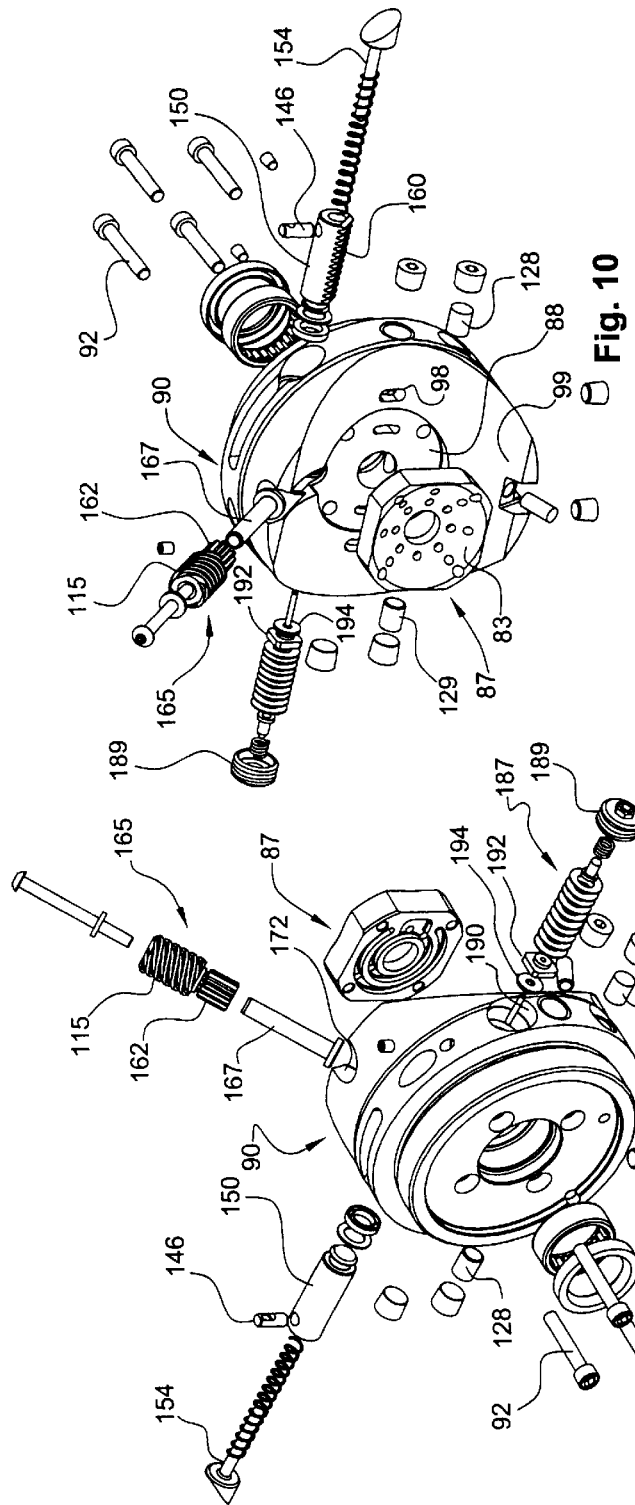
Fig. 10
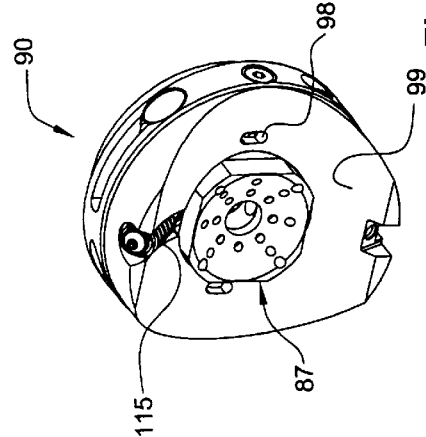
Fig. 11
Fig. 12
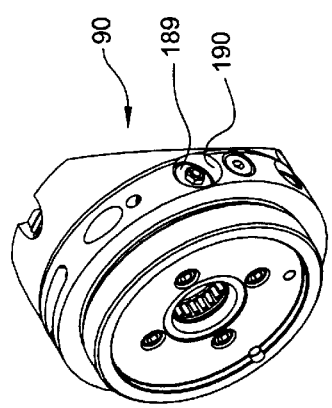
Fig. 13

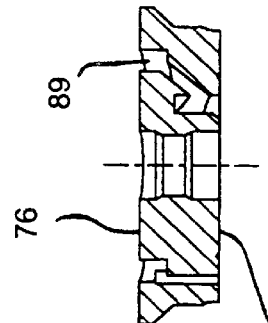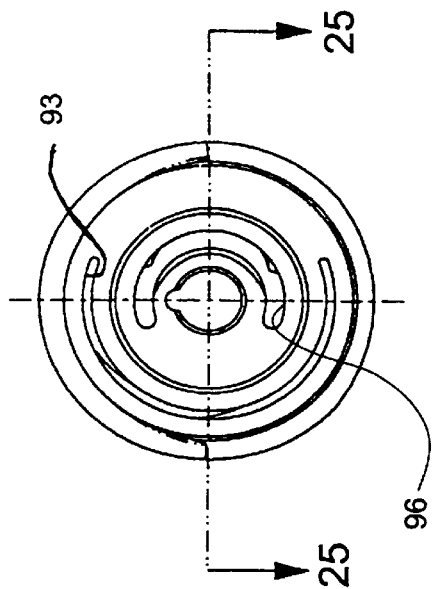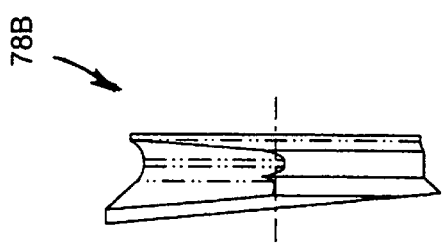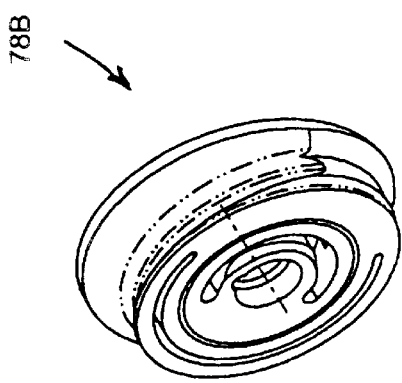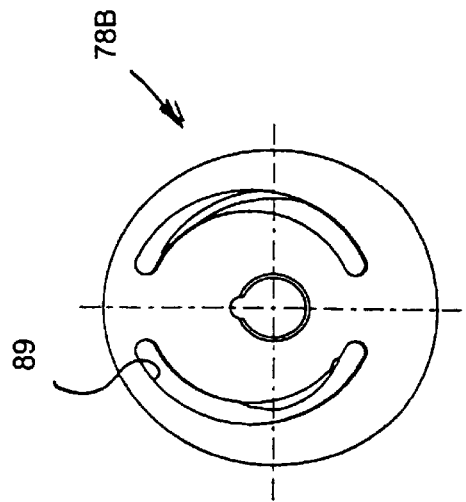

COMPACT COAXIAL PISTON TRANSMISSION

This application is a continuation of provisional application Ser. No. 60/058,488, filed on Sep. 10, 1997 now expired.

This invention pertains to hydrostatic transmissions, and more particularly to axial piston transmissions having a coaxial arrangement of hydraulically coupled pump and motor units, each mechanically coupled to each other and to the output shaft by a planetary gear system.

BACKGROUND OF THE INVENTION

Interest in continuously variable hydrostatic transmissions has been increasing in recent years because of the potential operational efficiencies and economies that are increasingly becoming possible in vehicles and other powered systems wherein rotary input power is to be converted to output power at the desired output torque and speed. Examples of continuously variable transmissions that make such efficiencies and economies possible can be found in the following U.S. Patent Applications and Patents:

U.S. Pat. No. 5,423,183 entitled "Hydraulic Machine with Wedge-Shaped Swashplate" issued on Jun. 13, 1995 to Lawrence R. Folsom.

U.S. Pat. No. 5,630,318 entitled "Method of Pumping with a Vane-Type Pump Having a Flexible Cam Ring" issued on May 20, 1997 to Lawrence R. Folsom and Clive Tucker.

U.S. patent application Ser. No. 09/023,653 entitled "Concentric Radial Piston Transmission" filed on Feb. 8, 1998 by Lawrence R. Folsom and Clive Tucker.

U.S. patent application Ser. No. 09/058,719 entitled "Concentric Axial Piston Transmission" filed on Apr. 10, 1998 by Lawrence R. Folsom and Clive Tucker.

The devices shown in these patents and patent applications constitute a significant improvement over the prior art and an evolving progressive improvement among themselves. They provide operational efficiencies and economies in the vehicle superior to any known transmission, and do so in packages that are smaller and lighter weight than other available transmissions.

However, conventional prior art hydrostatic transmissions are known by experts in the art to be noisy and inefficient. Convincing those experts and vehicle manufacturers that these new generation hydrostatic transmissions have overcome the intractable problems of the prior art is difficult. Therefore, additional improvements would facilitate acceptance of the new generation hydrostatic transmissions.

One such improvement would be in the area of leakage from rotating interfaces, particularly those where working fluid is commutated between the differentially rotating pump and motor.

Another improvement would be in the area of dynamic balancing. The difficulty of balancing rotating equipment to preclude vibration induced by rotating eccentric masses becomes worse exponentially with increasing speed of rotation.

Yet another improvement would be in reducing the losses caused by "windage" and fluid drag associated with the rotating elements inside the transmission housing. In applications having a prime mover with a high rotating speed, such as an electric motor, turbine engine or high performance spark ignition gasoline engine, the input elements would rotate at the prime mover output speed unless a gear reduction unit were interposed between the prime mover and the transmission. Gear reduction units add undesirable cost and weight. The windage and fluid drag losses can be greatly reduced by reducing the speed of rotation of those rotating elements.

One approach for achieving these improvements is shown in a U.S. Provisional application Ser. No. 60/065,377 filed on Nov. 12, 1997 by Folsom and Tucker entitled "Serial Bent Axis Apparatus". It would be desirable to use this approach or a variation thereof, in a concentric hydrostatic transmission in situations requiring more axial compactness, such as motor scooters, motor cycles, RV's and snowmobiles.

SUMMARY OF THE INVENTION

Accordingly, it is an object of this invention to provide an improved hydrostatic transmission having reduced use of rotating fluid interfaces and reduced rotational speed of rotating masses. Another object of this invention is to provide an improved hydrostatic transmission having simplified and reliable controls. Yet another object of this invention is to provide an improved hydrostatic transmission which is axially compact and still very compact in diameter for a concentric machine.

These and other objects of the invention are attained in a hydrostatic transmission having an axial piston pump driven by an input shaft. The pump has an annular pump cylinder block with a ring of cylinders in which pump pistons reciprocate to pressurize and displace fluid from the pump cylinders. The reaction torque from the pump is applied directly to an output shaft as a first output torque component. Fluid pressurized and displaced from the pump is conveyed to an axial piston hydraulic motor having an annular motor cylinder block, concentric with the pump cylinder block. The motor cylinder block has a ring of motor cylinders in which motor pistons reciprocate, with a power stroke that applies a second component of output torque to the output shaft, and a displacement stroke in which spent fluid is displaced from the motor cylinders for return to the pump cylinders.

DESCRIPTION OF THE DRAWINGS

The invention and its many attendant objects and advantages will become better understood upon reading the following detailed description of the preferred embodiments in conjunction with the following drawings, wherein:

FIG. 4 is an enlarged perspective view of the transmission shown in FIG. 1, viewed from the output end;

FIG. 5 is a perspective view of the body assembly of the transmission shown in FIG. 1;

FIG. 6 is an exploded perspective view of the body assembly shown in FIG. 5, showing the housing and the major internal subassemblies;

FIG. 9 is a sectional elevation of the transmission shown in FIG. 1 on a vertical plane through the longitudinal axis of the machine;

FIG. 9B is a sectional elevation of a second variant of the FIG. 1 embodiment;

FIGS. 10 and 12 are exploded perspective views, from opposite sides, of the front housing block shown in FIG. 6;

FIGS. 11 and 13 are perspective views of the assembled housing blocks shown in FIGS. 10 and 12, respectively;

FIG. 18A is a sectional view along lines 18A—18A in FIG. 9B;

FIG. 21 is a perspective view of the wobble plate shown in FIG. 9B;

FIG. 22 is an end elevation of the wobble plate shown in FIG. 21, viewed from the output side in contact with the pump cylinder block;

FIG. 23 is a side elevation of the wobble plate shown in FIG. 21;

FIG. 24 is an end elevation of the wobble plate shown in FIG. 21, viewed from the input side in contacts the port ring shown in FIGS. 26 and 27;

FIG. 25 is a sectional view along liner 25—25 in FIG. 24.

DESCRIPTION OF THE PREFERRED EMBODIMENT

Figure 1:
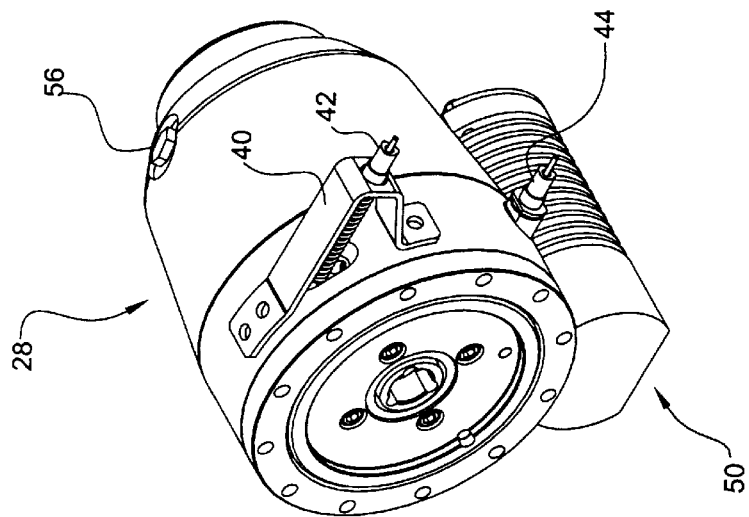
FIG. 1 is a perspective view of a transmission in accordance with this invention, viewed from the input end.
Figure 2:
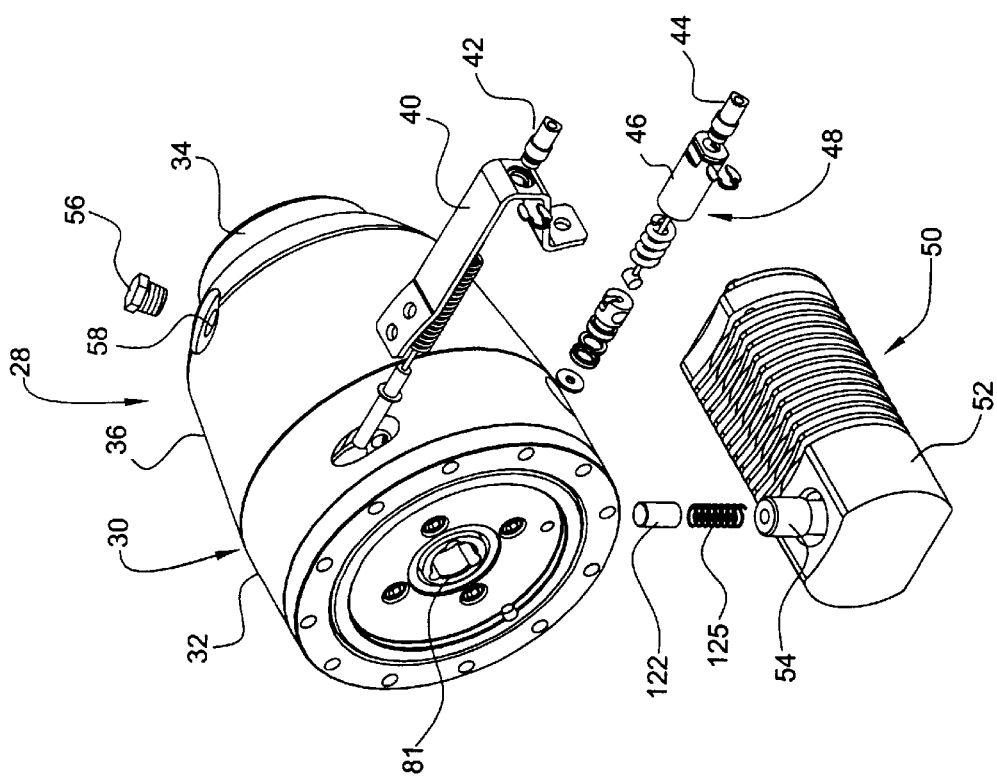
FIG. 2 is an exploded perspective view of the transmission shown in FIG. 1, showing the throttle and clutch controls exploded out to the side and the sump exploded from the bottom.
Figure 3:
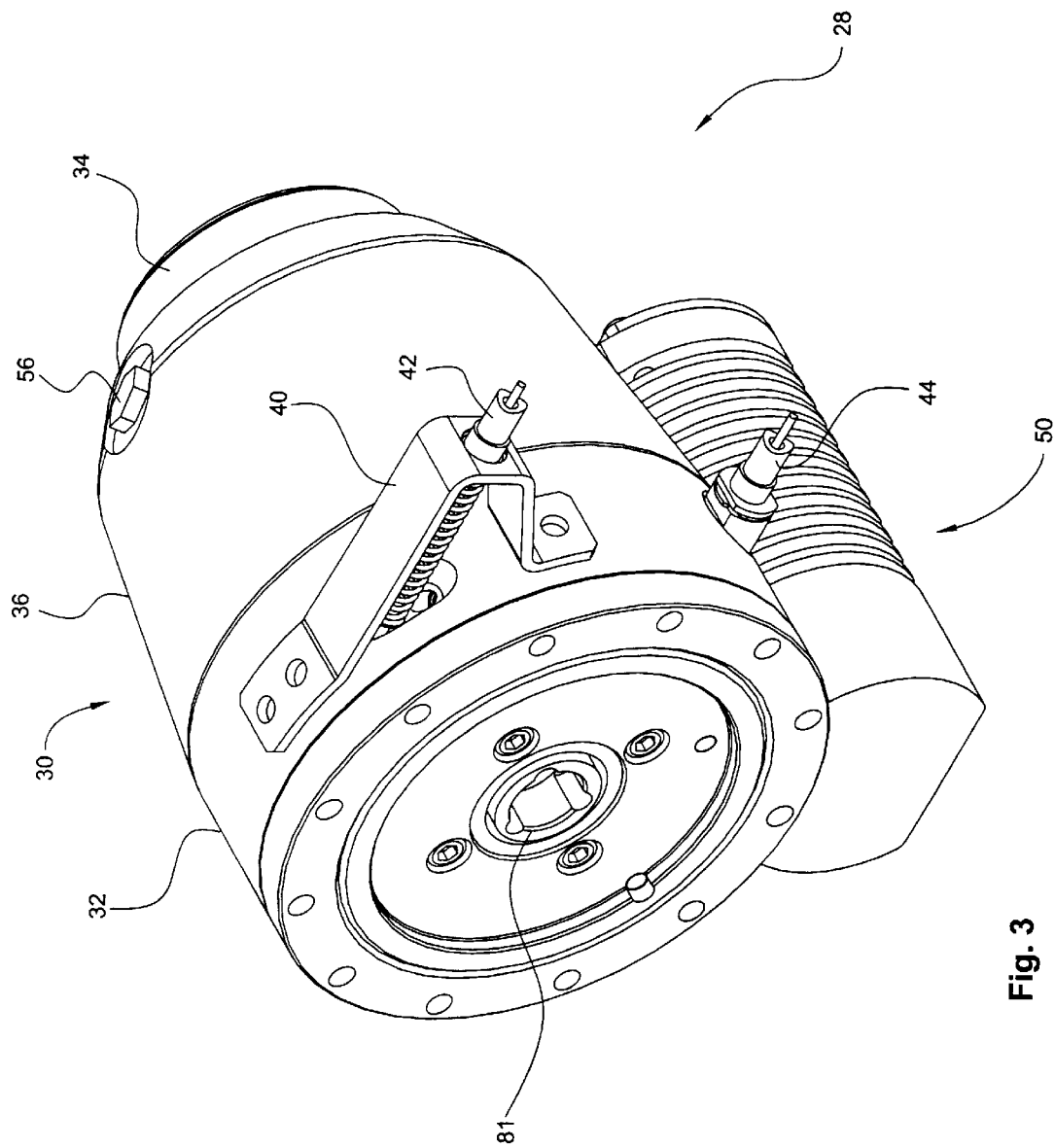
FIG. 3 is an enlarged view of FIG. 1.
Figures 7, 8:
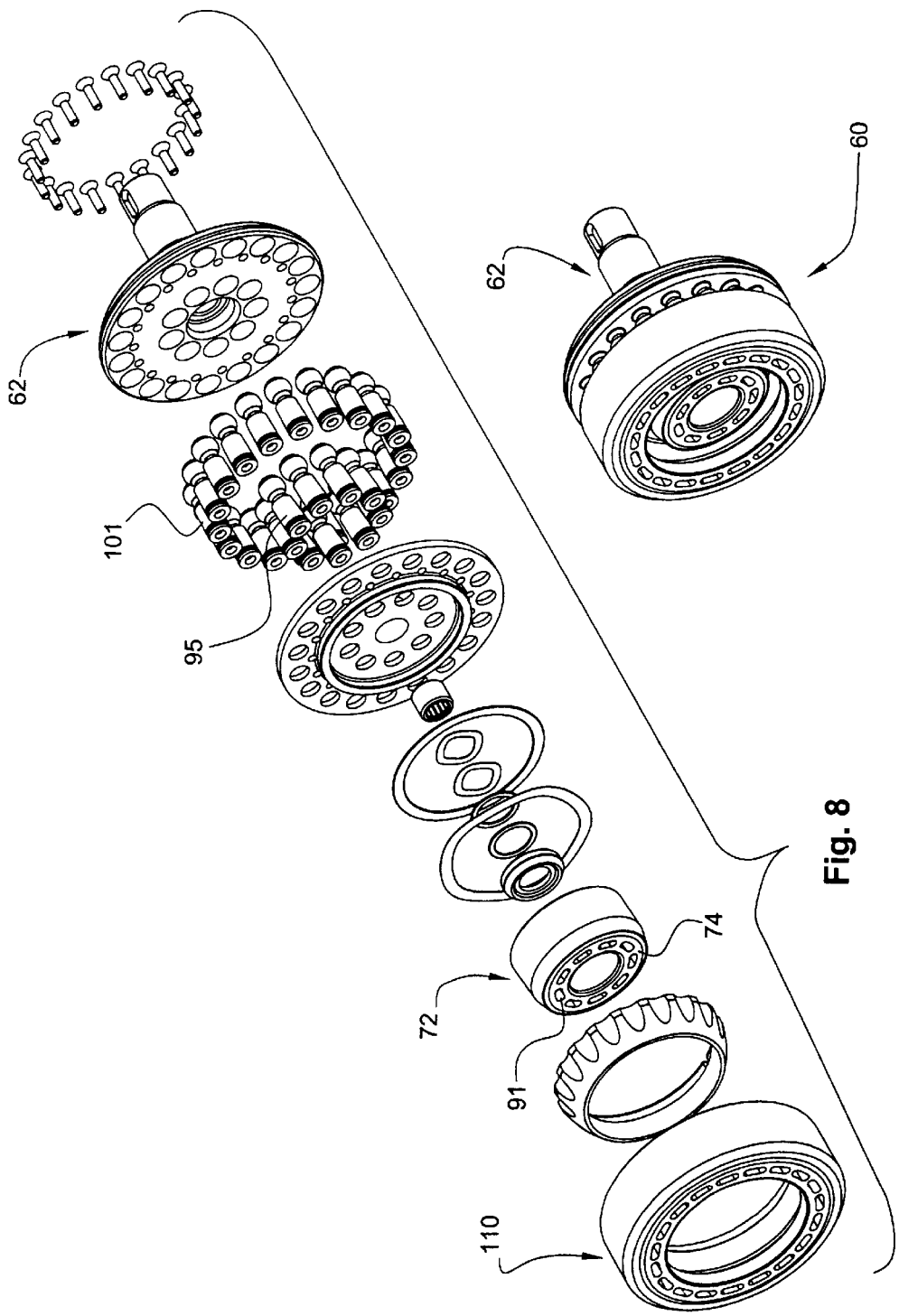
FIG. 7 is a perspective view of the output assembly shown in FIG. 6
FIG. 8 is an exploded view of the output assembly shown in FIG. 7.

Turning now to the drawings, wherein like reference numerals designate identical or corresponding parts, and more particularly to FIGS. 1–6 thereof, an axial piston transmission 28 in accordance with this invention is shown having a body assembly 29, shown in FIG. 5, including a housing 30 enclosing the internal components shown in FIG. 6. The housing 30 has an input end 32, an output end 34, and a tapered intermediate section 36. A bracket 40 is attached to the side of the input end 32 of the housing 30 for connecting a sheathed control cable 42, and a sheathed clutch cable 44 is attached to a clutch assembly 48, whose function and operation is described below. A fluid sump 50 having a ribbed sump tank 52 is fastened to the underside of the housing 30 by a threaded coupler 54, shown in FIGS. 9 and 18. A fill plug 56 is threaded into an internally threaded hole 58 through which hydraulic fluid can be added to the transmission 28.

The internal components of the body assembly 29, shown in FIGS. 6–9, include an output assembly 60 having an output shaft 62 supported in the output end 34 of the housing 30 in thrust and journal bearings 64 and 66, respectively. The output assembly 60 has a pump 70 driven by an input shaft, and a motor 71 driving the output shaft 62. The pump 70 includes an annular pump cylinder block 72 with a flat axial face 74 on its input end in contact with a corresponding flat face 76 of a wobble plate 78 keyed to the input shaft 80. The input end of the input shaft 80 is driven from a coupling 81 by an output shaft (not shown) of a prime mover, such as an electric motor or gas fired engine. The wobble plate 78 has a conical outwardly facing radial surface 82 that matches a conical inwardly facing radial surface 84 of a port ring 86, shown in FIG. 9. The port ring 86 has a convex spherical front surface 85, shown in FIGS. 6 and 9, that mates with a concave spherical surface 83 of a base ring 87, shown in FIGS. 9, 10 and 11, seated in an axial recess 88 of a front housing block 90. The base ring 87 is held in place in the recess 88 by four bolts 92, shown in FIGS. 12 and 13. The end of one of the bolts 92 extends into a small recess on the convex spherical front surface of the port ring 86 to prevent the port ring 86 from rotating but allow it to self align with the base ring 87 if eccentric forces exerted by the pump cause deflection of the wobble plate 78.

The port ring 86 and the base ring 87 could be made in as single part, as shown in FIGS. 9A and 14–17, if the eccentric forces exerted by the pump on the wobble plate 78 do not cause a problem. Alternately, the wobble plate 78 could have a flat interface with the port ring 86 as shown in FIG. 9B.

The wobble plate 78 rotates at input speed, driven by the input shaft 80 to which it is keyed. The flat face 76 of the wobble plate 78 is in contact with the flat face 74 of the pump cylinder block 72, which rotates at output speed. The wobble plate 78 has two kidney-shaped manifold slots 89 in its flat face 76 which are radially aligned with slots 91 in the front face of the pump cylinder block 72. One of the slots 89 collects pressurized fluid displaced from the pump cylinders 94 by the pump pistons 95, and the second slot 89 distributes spent fluid displaced from the motor cylinders 97 for suction back into the pump cylinders 94 during the refill stroke of the pump pistons 95.

Pressurized fluid is conveyed from one kidney-shaped slot 89 in the flat face 76 of the wobble plate to an annular groove in the opposite surface 82 of the wobble plate 78, in contact with the port plate 86, and spent fluid displaced from the motor is suctioned back into the pump cylinders 94 through a second annular groove in the surface 82 of the wobble plate 78 communicating with the second kidney-shaped slot in the flat face 76 of the wobble plate 78. The surface 82 of the wobble plate 78 is in contact with and rotates relative to the port ring 86, which does not rotate relative to the housing 30.

Figure 27:
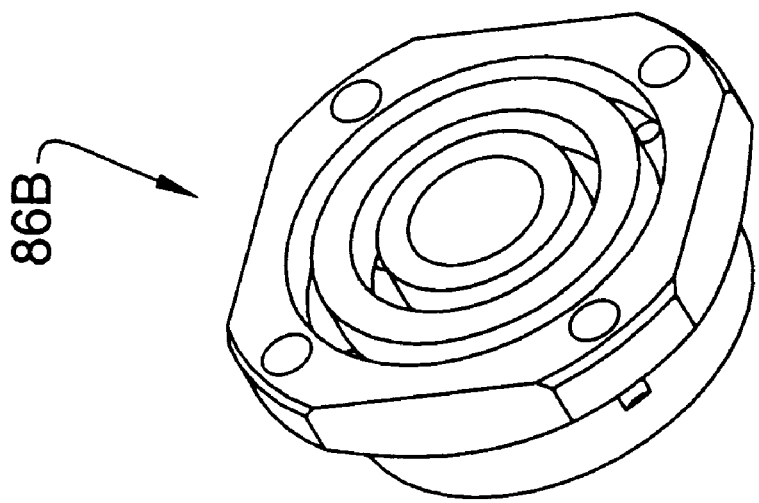
FIGS. 26 and 27 are perspective views of the port ring shown in FIG. 9B.
Figure 26:
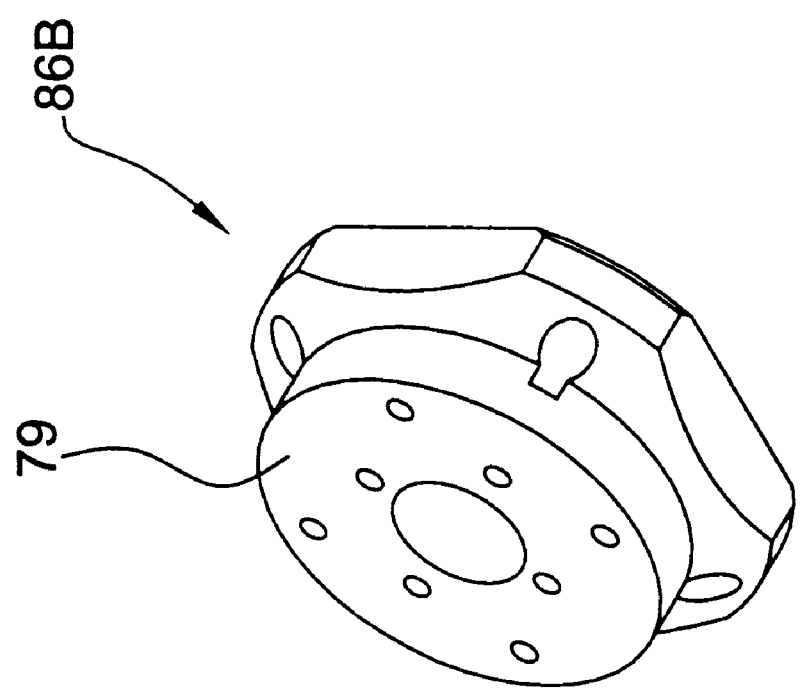

In the case of the flat faced wobble plate shown in FIG. 9B, the wobble plate 78B, shown in FIGS. 21–25, has the same coaxial grooves 89 in the face 76 as the embodiment of FIG. 9, as shown in FIG. 22. Two kidney-shaped grooves 93 and 96 in the opposite face 82, shown in FIGS. 21 and 24, each align with four holes arranged on each of two concentric circles on the flat face 79 of the port ring 86B, shown in FIGS. 26 and 27, with which the wobble plate face 82 is in contact. Two grooves are cut through the wobble plate 78B interconnecting one of the kidney-shaped grooves 89 in the face 76 with the outer kidney-shaped groove 93 in the face 82, and connecting the other kidney shaped groove 89 in the face 76 with the inner kidney-shaped groove 96 in the face 82. This arrangement, like the arrangement shown in FIG. 9, commutates the fluid flow paths to and from the pump into a pressure flow path and a suction return path.

Figure 18:
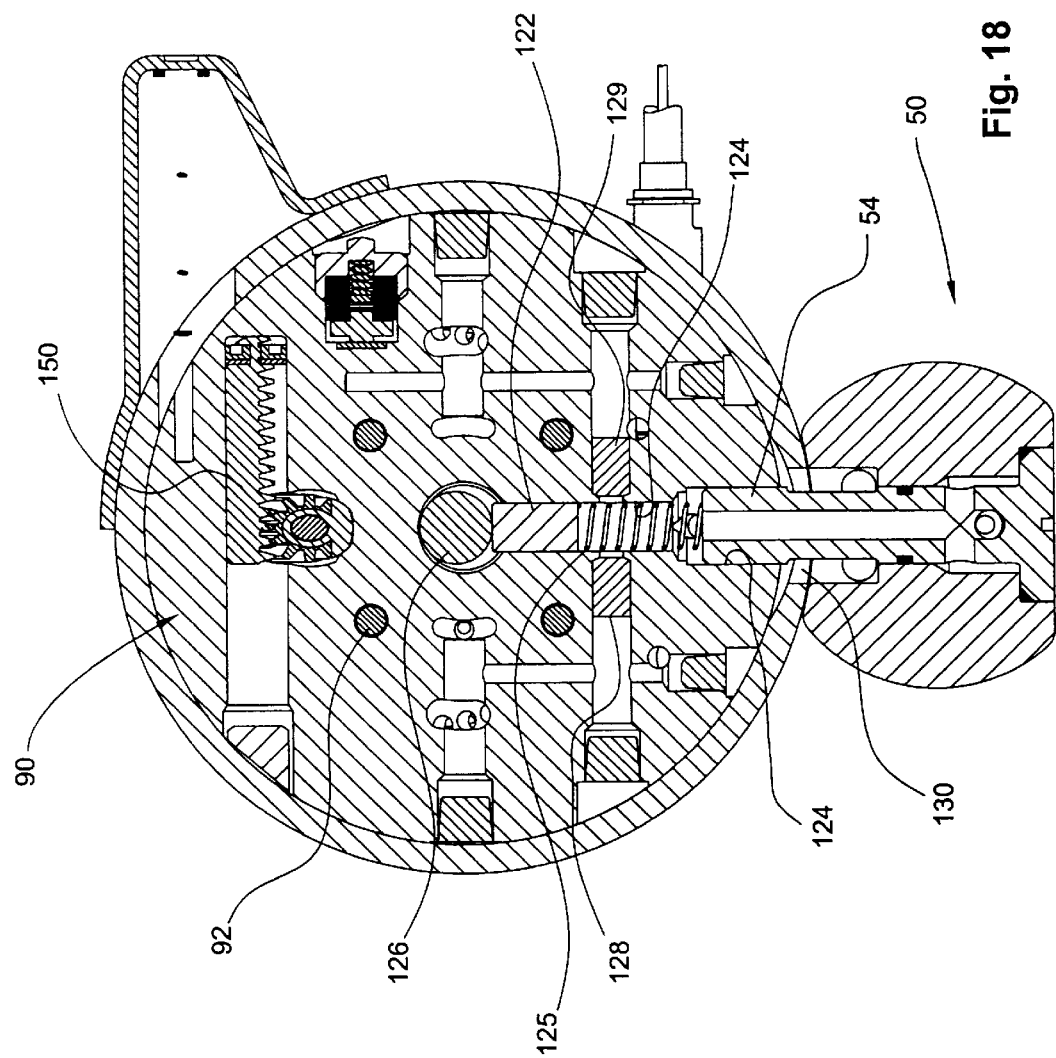
FIG. 18 is a sectional view along lines 18—18 in FIG. 9.
Figure 20:
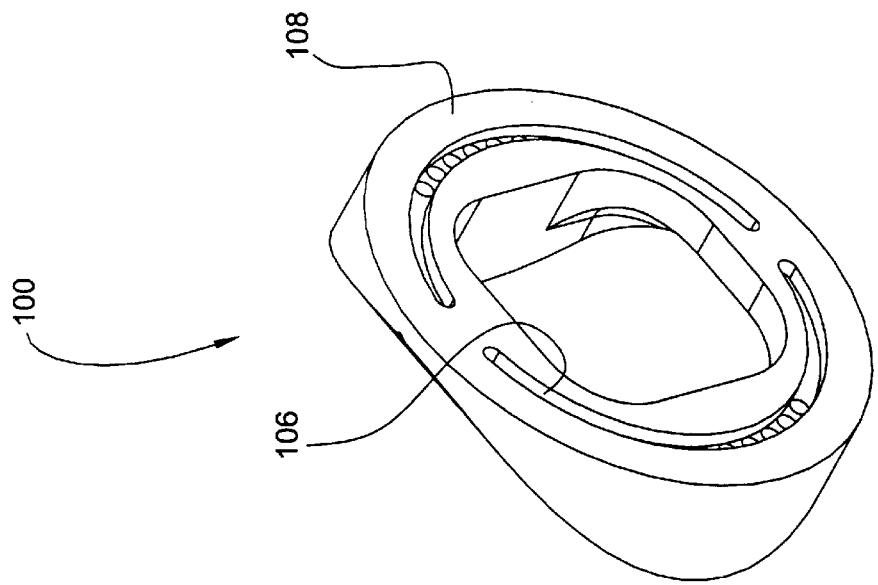
FIGS. 19 and 20 are perspective views from opposite sites, of the cam plate shown in FIG. 6.
Figure 19:
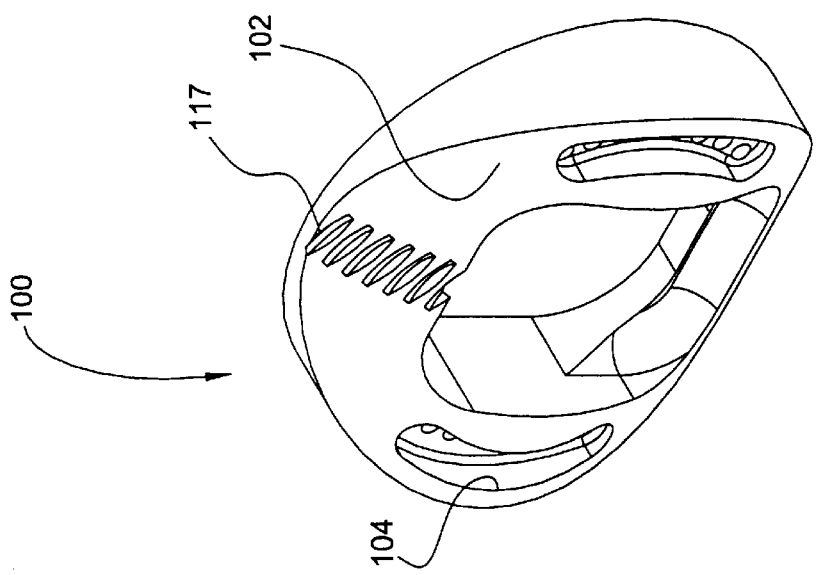

The fluid pressurized and displaced in the pump 70, is commutated in the wobble plate and the port ring, thence conducted through drilled passages in the front housing block 90 shown, in FIG. 18, to the proper cylinders in the motor 71. The pressurized fluid energizes the motor 71 to produce output torque delivered directly to the output shaft 62, as shown in FIGS. 6–9. The return stroke of motor pistons 101 in the motor cylinders 97 displaces spent fluid from the motor 71 which is conveyed back to the pump 70 on the refilling or suction stroke of pump pistons 95 in the ring of cylinders 94 in the pump cylinder block 72 through the port ring 86 and the wobble plate conical surface to the second kidney shaped slot in the flat face 76 of the wobble plate 78. The commutated flow is conveyed through the drilled passages in the front housing block 90 from the port ring 86 and the base ring 87 through kidney-shaped slots 98 in a cylindrical surface 99 of the front housing block 90.

An angularly adjustable cam plate 100, shown in FIGS. 6, 9, 19 and 20, has a convex cylindrical surface 102 in contact with the cylindrical surface 99 of the front housing block. The center of curvature on the cylindrical surface 99 and the cylindrical surface 102 lies on the axis 175 of the machine at its intersection 103 with the plane of the input side of the output shaft plate 174. The cam plate 100 has kidney-shaped slots 104 communicating with the kidney shaped slots 98 in the front cylindrical surface 99 of the front housing block 90 for conveyance of pressurized fluid from the pump 70 to the motor 71, and conveyance of spent fluid from the motor 71 back to the pump 70. The rear or output face 108 of the cam plate 100 is flat and in contact with the base of the motor cylinder block 110 of the motor 71. The motor cylinder block 110 is driven to rotate around the flat face of the cam plate 100 by the radial component of the force of the motor pistons responsive to fluid pressure conveyed into the motor cylinders through kidney shaped slots 106 in the flat face 108 of the cam plate 100. The cam plate is angularly adjustable through the agency of a worm gear 115 engaged with worm threads 117 in the cylindrical face 102.

A make-up pump 120, shown most clearly in FIGS. 9 and 18, includes a spring-loaded pump piston 122 in a cylinder 124 in the front housing block 90. The piston 122 is reciprocated in the cylinder 124 by an eccentric section 126 of the input shaft 80 functioning as a cam. On the pressure stroke of the piston 122, fluid is displaced from the cylinder 124 and through check valves 128 or 129 whenever the pressure in the drilled fluid passages in the front housing block falls below the output pressure of the make-up pump 120, typically about 14 PSI, thereby ensuring that the system remains fully charged with fluid despite any leakage into the housing 30. Any such leakage drains from the housing 30 through an annular drain opening 130 into the sump from which it is drawn through a filter 132, a check valve 134, and an axial bore 136 in the threaded coupler 54 back into the cylinder 124 during the suction stroke of the pump piston 122 under the influence of the return spring 125.

Figure 28:
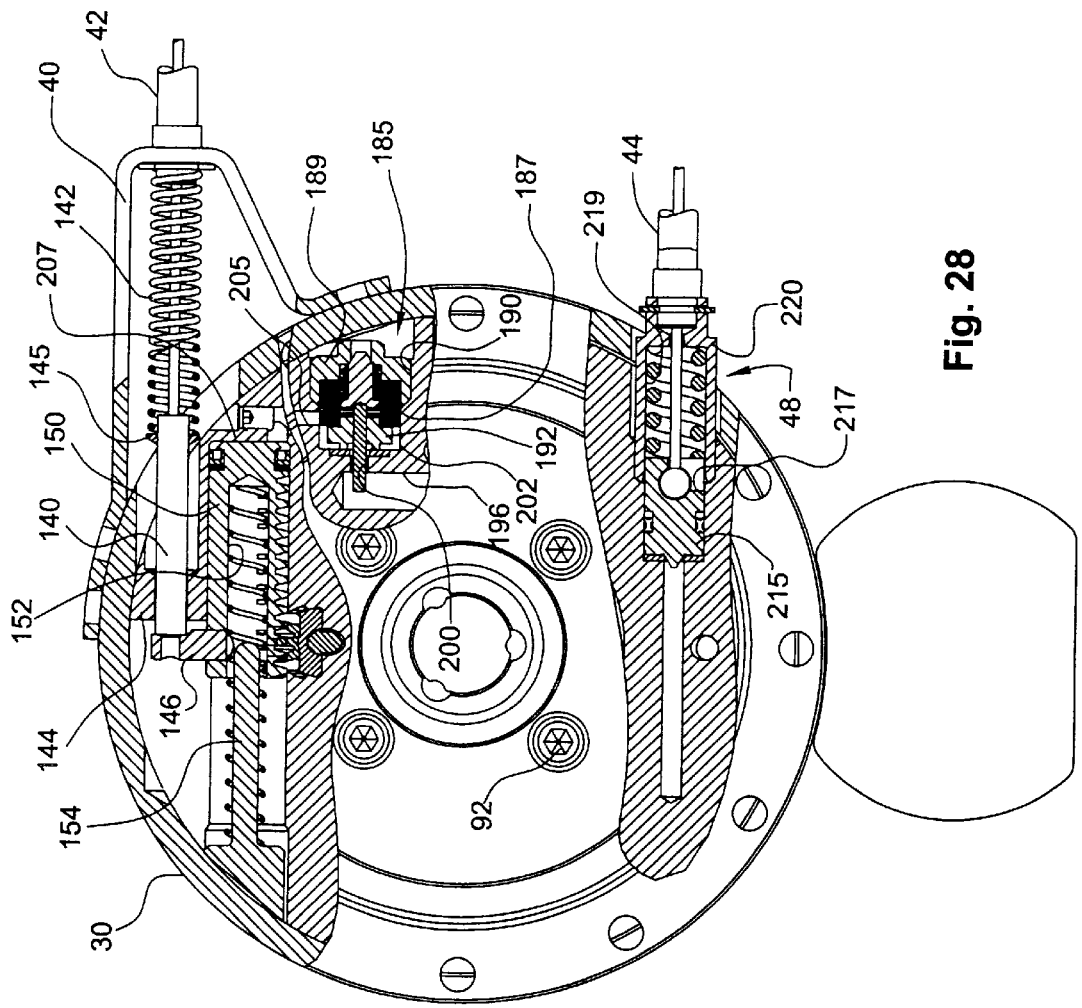
FIG. 28 is an end elevation, partly in section, of the front housing block shown in FIG. 6, showing several elements of the controls.

A control system for controlling the transmission ratio, best shown in FIGS. 9, 10, and 28, includes a rod 140 attached to the control wire inside the sheathed control cable 42 and extending through an opening in the housing 30 and guided for linear motion in a guide 144 in the front housing block 90. A compression spring 142 is biased between the bracket 40 and a collar 145 attached to the rod 140 to bias the rod 140 toward the position that will adjust the cam plate 100 to give the motor maximum displacement. The rod is attached at its inner end to a tang 146 secured to a plunger 150 which is guided for linear sliding motion in the front housing block 90 by a cylinder 152 in which it slides, and also by a guide rod 154 extending into an axial bore in the plunger 150. The plunger 150 has a gear rack 160 machined into one longitudinal side which is engaged with a spur gear 162 of a control gear 165 mounted for rotation about its axis on a bearing sleeve 167 secured in the front housing block 90. Motion of the plunger 150 along its axis causes the gear rack 160 engaged with the spur gear 162 to rotate the control gear 165 on the bearing sleeve 167.

The control gear 165 has a worm gear section 115 that lies in a cylindrical recess 172 partially intersecting the cylindrical surface 99 of the front housing block. The threads of the worm gear 115 project out of the cylindrical recess 172 and engage the worm threads 117 on the cam plate 100 to tilt the cam plate about the cylindrical axis of the cylindrical surface 99 which lies in the plane of the front face of the output shaft plate 174 and intersects the main longitudinal axis 175 of the transmission at a point 180 which coincides with the axis of nutation of the pump and motor cylinder blocks 72 and 73.

A pressure compensation valve assembly 185, shown in FIG. 28, has a stack of Bellville springs 187 compressed between a plug 189 threaded into a hole 190 in the side of the front housing block 90 and a valve member 192 which is biased by the Bellville springs 187 into sealing contact with a sealing washer 194. A passage 196 drilled in the front housing block 90 connects to the high pressure channel of the fluid distribution system in the front housing block 90. The valve member 192 is exposed to this pressure through a hole 200 leading from the passage 196 to a chamber 202 holding the valve member 192 and the Bellville springs 187. When the pressure in the high pressure channel is high enough to overcome the spring force in the other direction on the valve member 192, pressurized fluid flows from the passage 196 through the hole 200, through the valve assembly 185, and through a passage 205 into the cylinder 152 where it acts against the face 207 of the plunger 150, moving the plunger to the left in FIG. 28. Leftward movement of the plunger 150 rotates the control gear 165 and tilts the cam plate 100 toward a lower transmission ratio, lowering the fluid pressure in the high pressure channel. This pressure compensation occurs when the resisting torque on the output shaft 62 increases because of the load, for example, when the vehicle is ascending a hill, and results in automatic downward adjustment of the transmission ratio when the load increases.

The clutch 48, also shown in FIG. 28, includes a piston/valve member 215 biased by a compression spring to a closed position in a cylinder 217 in the front housing block 90. The spring is compressed between the outside face of the piston/valve member 215 and the end of a bore 219 in an externally threaded sleeve 220 threaded into the front housing block 90. The piston/valve member 215 can be pulled by the control cable 44 to allow pressurized fluid to flow from the high pressure channel in the front housing block 90 to the low pressure channel, effectively short circuiting the fluid flow path and reducing output torque to zero. This allows the vehicle operator to start the vehicle in a slow controlled manner by gradually closing the piston/valve member to apply fluid pressurized in the pump 70 to the motor at an adjustable flow rate, and also to clutch to zero torque without downshifting.

Second Embodiment

Figure 9A:
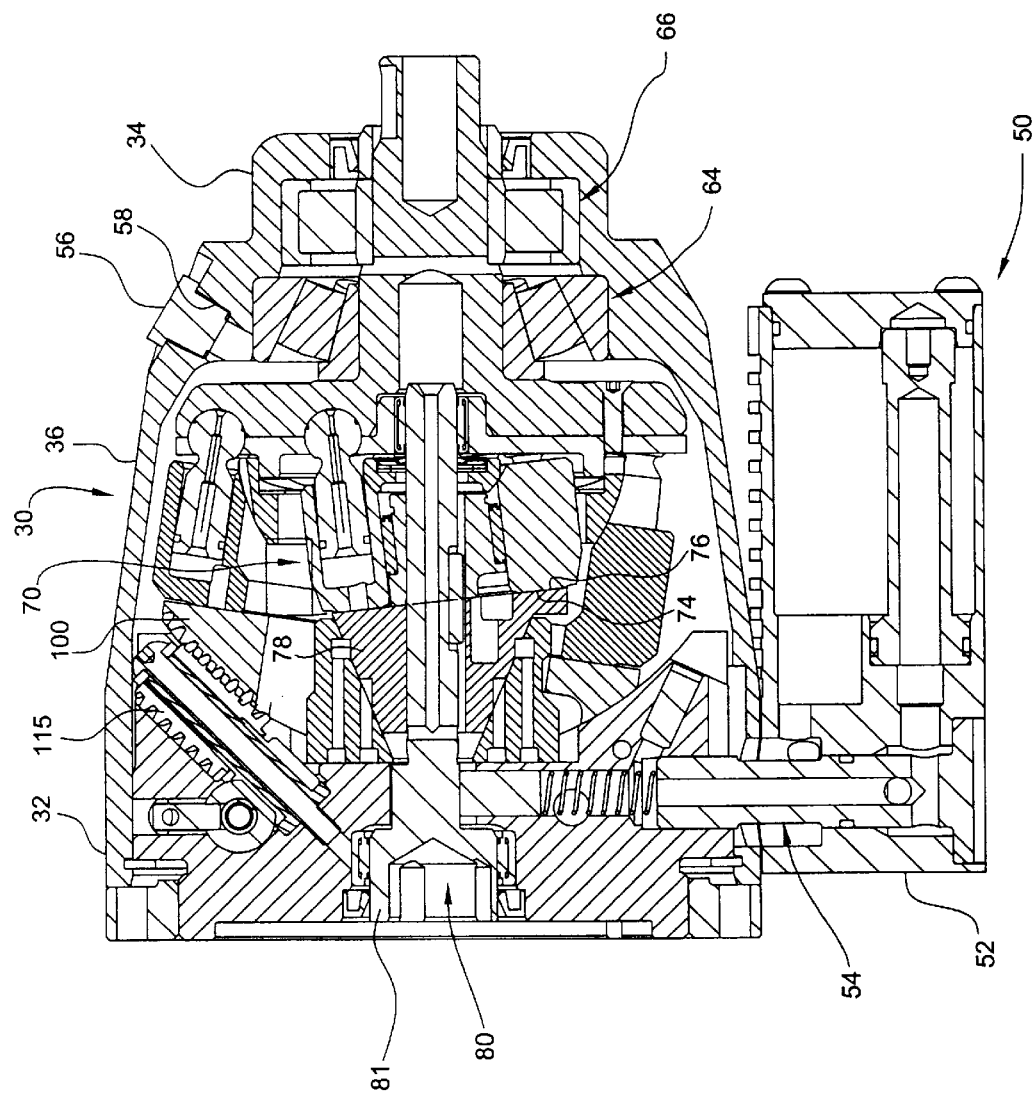
FIG. 9A is a sectional elevation of a variant of the embodiment shown in FIG. 9.
Figure 17:
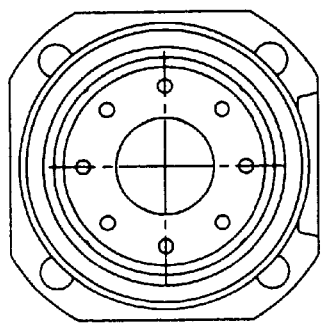
FIG. 17 is an end elevation of the port ring shown in FIG. 14, viewed from the output end.
Figure 14:
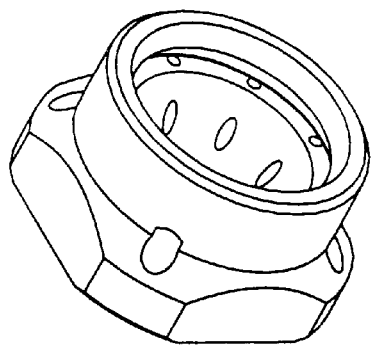
FIG. 14 is a perspective view of the pot ring shown in FIG. 9A.
Figure 16:
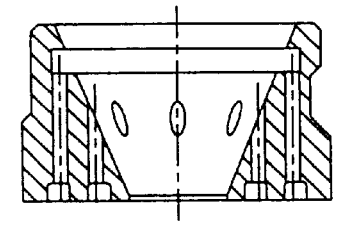
FIG. 16 is a sectional elevation along lines 16—16 in FIG. 15.
Figure 15:
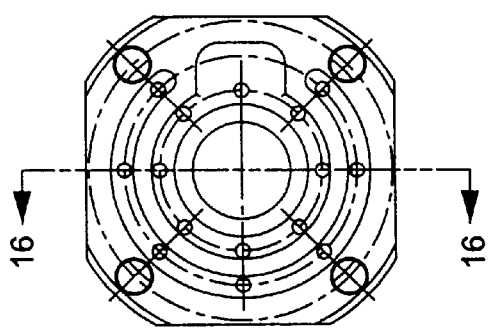
FIG. 15 is an end elevation of the port ring shown in FIG. 14, viewed from the input end.
Figure 29:
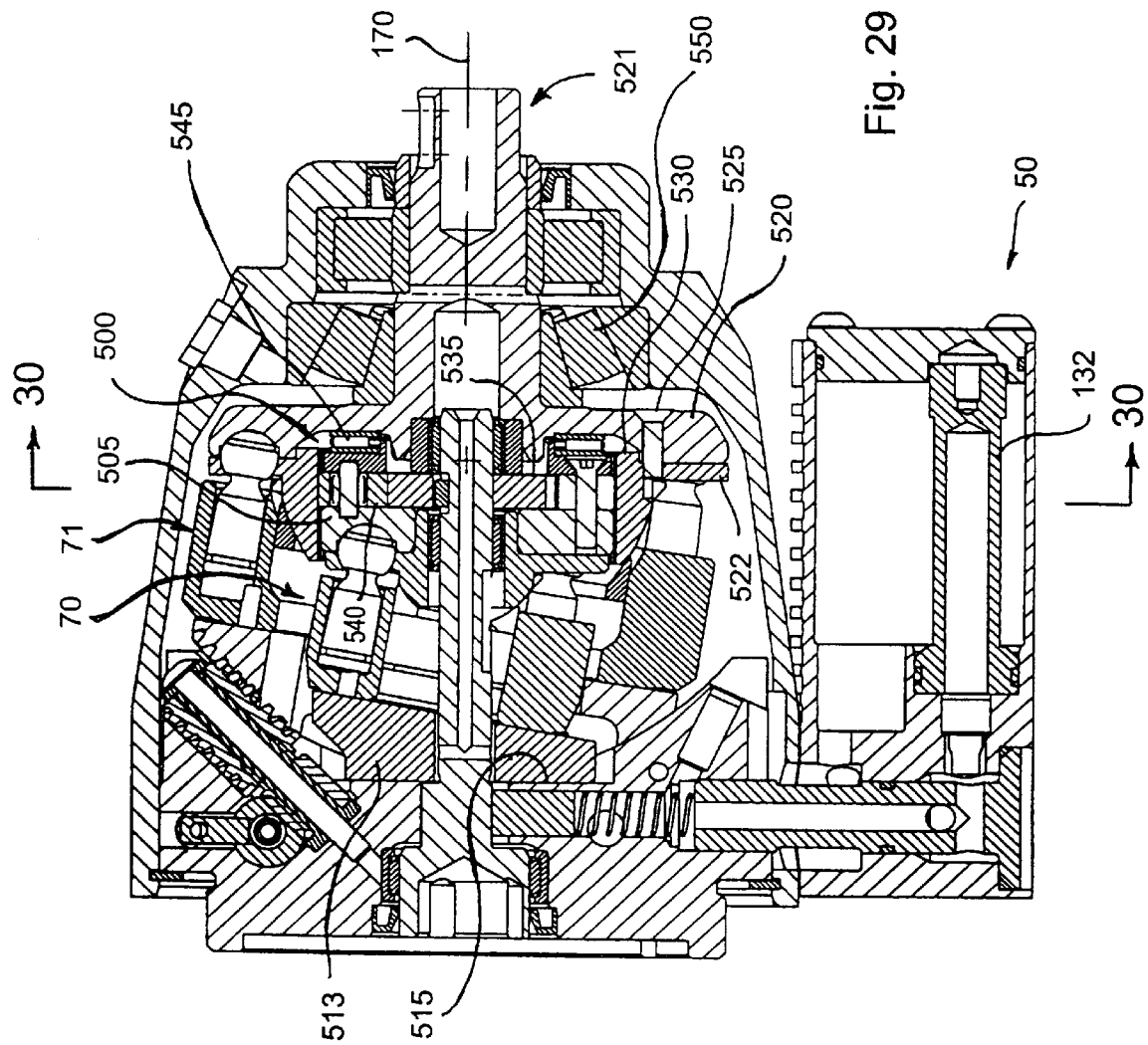
FIG. 29 is a sectional elevation of a second embodiment of a hydrostatic transmission in accordance with this invention.
Figure 30:
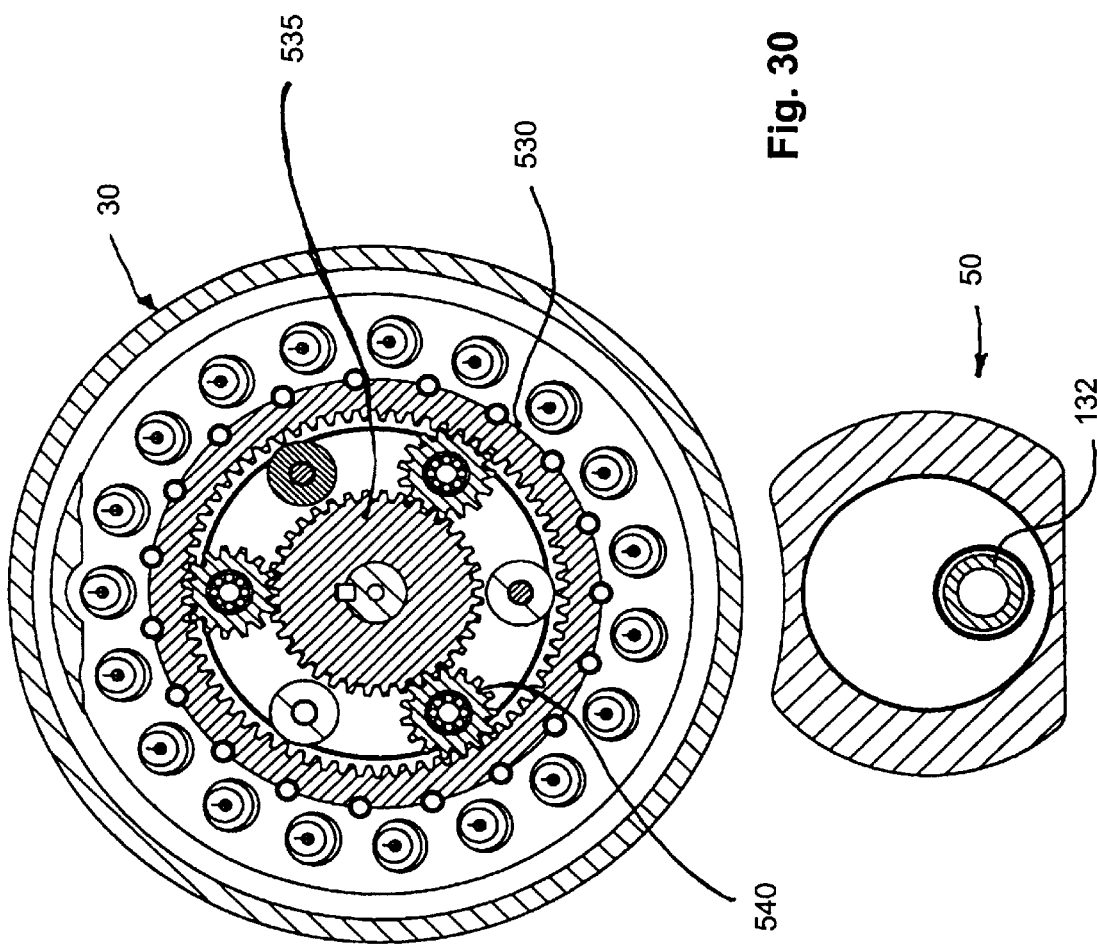
FIG. 30 is a sectional view along lines 30—30 in FIG. 29.

Turning now to FIGS. 29 and 30, a second embodiment of the invention is shown having housing and sump structures identical to the embodiments of FIGS. 9 and 9A, but having the pump 70 driven from the piston heads by a planet carrier 505 of a planetary gear set 500 interposed between the pump and motor units 70 and 71, respectively. In this embodiment, the pump cylinder block is driven by the planetary gear set instead of the pump wobble plate. The pump unit 510 includes a fixed wobble plate 513 fastened to a flat axially facing surface 515 on the front housing block 90. The wobble plate 513 has a flat axially facing surface lying at an angle of about 920 to the axis 175 of the machine. The fluid flow channels for flow and control of fluid between the pump 70 and the motor 71 are the same as described above for the first embodiment.

The motor piston heads are secured in hollows in the output shaft plate 520 of an output shaft 521 by an attachment plate 522, fastened by screws 525 to the output shaft plate 520. The attachment plate 522 is integral with the ring gear 530 of the planetary gear set 500. The sun gear 535 of the planetary gear set 500 is keyed to and driven by the input shaft, and drives the planet gears 540 on the planet carrier 505. The axial force exerted by the pump 70 on the planet carrier is reacted by needle bearings 545 between the planet carrier and an anular recess in the input face of the output shaft plate 520. That force is in turn transmitted through thrust bearings 550 to the housing 30.

Relating the pump and motor directly through a variable ratio gearset such as an epicyclic gear set allows for the same benefits of the first embodiment, namely the transmission of reaction torque from the pump into the output shaft, and the ability of the transmission to transmit a percentage of energy mechanically to the output shaft instead of converting that all the input energy to fluid energy and then back again to mechanical energy. The resulting io efficiency far exceeds conventional hydrostatic transmissions which operate in this fashion. It also enables the use of true bent axis hydrostatic pumps and motors which can readily be balanced to a high degree of dynamic balance, and once balanced, remain balanced throughout their operating ranges. The task of achieving dynamic balance of rotating components, especially when the rotational speed is high, is thereby greatly simplified. Finally, the epicyclic gear set provides the means to enable use of a high rotational speed for the smaller diameter input rotating element, the pump 70 and elements rotating therewith, in applications that use a high speed prime mover such as an electric motor or a high performance gas powered engine such as a gas turbine or modern internal combustion spark ignition engine. The output elements, the motor 71 and elements rotating therewith, are inherently reduced to a lower speed than the input speed by virtue of the epicyclic gear set, so no additional gear reduction is needed.

Operation of the transmission will be described with reference to operation of an electric motor scooter, although the transmission would also be useful in the drive train of other types of vehicles and driven by other types of prime movers, as mentioned previously. The motor scooter envisioned has a high efficiency DC electric motor energized by a battery pack. The motor has a constant speed of rotation and the transmission converts the rotary power of the electric motor to speed and torque desired by the driver. Significant system efficiencies are attained with such a motor when used with a high efficiency continuously variable transmission compared to use of a variable speed electric motor.

When starting the vehicle from zero, the transmission is initially adjusted to neutral by opening the clutch 48 and adjusting the motor 71 to maximum displacement. The motor is started and the input shaft 80 drives the sun gear 535 which drives the planet gears 540 and the planet carrier 505. Since the clutch is open, there is no significant load on the motor 70 and therefore no reaction torque to drive the ring gear, so there is no torque to the output shaft. The clutch 48 is gradually closed to direct fluid pressurized in the pump into the motor, producing high torque and low output speed in the motor which drives the output shaft 521. The fluid channels in this embodiment are reversed from those in the first embodiment because the pump and motor rotate in opposite directions, due to the direction reversal produced by the planetary gear set. Therefore, the motor is arranged to drive the input shaft 80 in the opposite direction from the output shaft 521.

The vehicle is accelerated up to the desired cruising speed by stroking the motor 71 from its maximum displacement position, illustrated in FIG. 29, to some intermediate displacement that produces the desired speed. The motor displacement is adjusted by moving a control, such as a hand grip, lever or peddle attached to the cable 42 to pull the cable against the force of the return spring 142 toward the minimum or zero displacement position illustrated in FIG. 28. Pumping of fluid from the pump 70 to the motor 71 produces output torque in the motor 71 delivered directly to the output shaft 521, and the reaction torque from the resistance of the pump is transmitted from the planet gears 540 to the ring gear 530 and added to the output torque in the output shaft 521. When the motor 71 is stroked all the way to zero displacement, the pump is locked against rotation and serves as a stationary reaction unit to hold the planet carrier stationary, all the input power is conveyed mechanically from the sun gear 535 through the rotating planet gears 540 to the ring gear 530, reduced in speed by the ratio of the planetary gear set 500.

A brake may be used for locking the rotational element of the pump 70 to ground when the transmission is in the "locked-up" or final drive configuration. A brake band could be placed around the pump cylinder and the wobble plate 513 and tightened by a conventional actuator for locking the pump cylinder block against rotation relative to ground. This brake would increase efficiency by stopping any slipping of the pump cylinder block due to hydraulic leakage, and it will reduce the hydraulic system pressure to make-up pressure thereby reducing the load and hence windage loss of the motor 71.

Obviously, numerous modifications and variations of the preferred embodiments described above are possible and will become apparent to those skilled in the art in light of this specification. For example, many functions and advantages are described for the preferred embodiment, but in some uses of the invention, not all of these functions and advantages would be needed. Therefore, we contemplate the use of the invention using fewer than the complete set of noted functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims.

Wherein we claim:

1. A hydrostatic axial piston transmission having a continuously variable transmission ratio, comprising:

an axial piston pump driven by an input shaft, said pump having an annular pump cylinder block with a ring of cylinders in which pump pistons reciprocate to pressurize and displace fluid from said pump cylinders, said pump pistons having piston heads coupled to an output shaft for conveying reaction torque from said input shaft directly to said output shaft as a first output torque component;

an axial piston hydraulic motor having an annular motor cylinder block with a ring of motor cylinders in which motor pistons reciprocate in a power stroke to apply output torque to said output shaft, and a displacement stroke in which spent fluid is displaced from said motor cylinders for return to said pump cylinders;

said pump cylinder block being concentrically disposed within the annulus of said motor cylinder block, and said input shaft and said output shaft lying on a longitudinal axis through said annulus;

a wobble plate coupled to and driven by said input shaft and having a flat surface in contact with said pump cylinder block, said flat surface lying at an angle to said longitudinal axis;

said wobble plate flat surface having a first slot opening therein for conveying fluid pressurized and displaced by said pump pistons through first passages in said wobble plate, and also having a second slot opening in said flat surface for conveying spent fluid conveyed through second passages in said wobble plate from said motor cylinders back to said pump cylinders in a suction stroke of said pump pistons;

a port ring having a face in contact with said wobble plate and having pressure fluid slots opening in said face for conducting fluid pressurized in said pump and conducted through said first slot in said wobble plate and said first passages in said wobble plate to pressure passages in a housing block, and also having suction fluid slots opening in said face for conducting spent fluid displaced from said motor through suction fluid passages in said housing block and back to said wobble plate second passages by way of said suction fluid slots; and an annular cam plate having a cylindrical surface engaged with a corresponding cylindrical surface on said housing block for tilting at an angle relative thereto about an axis transverse to said longitudinal axis, said cam plate having a flat annular surface in contact with a corresponding flat annular surface on said motor cylinder block and having a pressure slot opening in said cam surface in fluid communication with said motor cylinders, and having a pressure passage through said cam plate communicating with a pressure slot opening in said cylindrical surface of said cam plate in fluid communication with a corresponding pressure slot in said cylindrical surface on said housing block in fluid communication with said pressure passages in a housing block;

whereby rotation of said input shaft drives said wobble plate to rotate and cause said pump cylinder block to nutate in contact with said wobble plate flat surface, thereby causing said pump pistons to reciprocate in said pump cylinders and displace pressurized fluid through said wobble plate while also transmitting reaction torque to said output shaft, said pressurized fluid being commutated by said wobble plate and conveyed through said port ring, said housing block pressure passage, and said cam plate pressure passage to said motor where said pressurized fluid energizes said motor to produce a second component of output torque in said output shaft.

2. A hydrostatic axial piston transmission as defined in claim 1, further comprising:

a control system for controlling said angle to tilt of said cam plate, thereby controlling displacement of said motor and said transmission ratio, said control system including a gear rack in said cylindrical surface of said cam plate and a control worm gear in said housing block that is rotatable by remote control to control said tilt angle of said cam plate.

3. A hydrostatic axial piston transmission as defined in claim 2, further comprising:

a pressure compensation valve assembly for automatically lowering said transmission ratio of said transmission when system pressure exceeds a predetermined value, including a plug that is spring biased to block fluid flow into a control cylinder;

whereby system pressure above said predetermined value overcomes said biasing spring and flows into said control cylinder and moves said control piston to shift said cam plate toward a lower gear.

4. A hydrostatic axial piston transmission as defined in claim 2, further comprising:

a clutch having a piston/valve member that can be opened by remote control to allow pressurized fluid to flow from said pressure passage in said housing block to said suction passage in said housing block, effectively short circuiting the fluid flow path and reducing output torque to zero;

whereby operators of a vehicle in which said transmission is installed can start said vehicle in a slow controlled manner by gradually closing said piston/valve member to apply fluid pressurized in said pump to said motor at an adjustable flow rate, and also to clutch to zero torque without downshifting.

5. A hydrostatic axial piston transmission having a continuously variable transmission ratio, comprising:

an axial piston pump driven by an input shaft, said pump having an annular pump cylinder block with a ring of cylinders in which pump pistons reciprocate to pressurize and displace fluid from said pump cylinders, said pump pistons having piston heads coupled to a first element of a variable ratio gearset, said gearset having a second element driven by said input shaft and having a third element coupled to said output shaft for conveying reaction torque from said input shaft directly to said output shaft as a first output torque component;

said pump cylinder block being concentrically disposed within the annulus of said motor cylinder block, and said input shaft and said output shaft lying on a longitudinal axis through said annulus;

a port ring having a flat face tilted with respect to said longitudinal axis and in contact with said pump cylinder block, said flat face having suction fluid slots and pressure fluid slots opening in said face for conducting fluid pressurized in said pump through openings in said pump to pressure passages in a housing block, and also having suction fluid slots opening in said face for conducting spent fluid displaced from said motor through suction fluid passages in said housing block and back to said pump cylinders by way of said suction fluid slots; and an annular cam plate having a cylindrical surface engaged with a corresponding cylindrical surface on said housing block for tilting at an angle relative thereto about an axis transverse to said longitudinal axis, said cam plate having a flat annular surface in contact with a corresponding flat annular surface on said motor cylinder block and having a pressure slot opening in said cam surface in fluid communication with said motor cylinders, and having a pressure passage through said cam plate communicating with a pressure slot opening in said cylindrical surface of said cam plate in fluid communication with a corresponding pressure slot in said cylindrical surface on said housing block in fluid communication with said pressure passages in a housing block;

whereby rotation of said input shaft drives said pump by way of said pump piston heads to rotate and cause said pump cylinder block to rotate about an angle tilted with respect to said longitudinal axis in contact with said port ring flat surface, thereby causing said pump pistons to reciprocate in said pump cylinders and displace pressurized fluid through said wobble plate while also transmitting reaction torque to said output shaft, said pressurized fluid being commutated by said port ring and conveyed through said port ring, said housing block pressure passage, and said cam plate pressure passage to said motor where said pressurized fluid energizes said motor to produce a second component of output torque in said output shaft.

* * * * *